United States Patent [19]

Dimas

[11] 3,983,779

[45] Oct. 5, 1976

[54] NAIL

[75] Inventor: George J. Dimas, Parma, Ohio

[73] Assignee: Eaton Corporation, Cleveland, Ohio

[22] Filed: Mar. 10, 1975

[21] Appl. No.: 556,752

[52] U.S. Cl. ............................ 85/21; 85/11
[51] Int. Cl.² ............................ F16B 15/06
[58] Field of Search ............................ 85/11, 21

[56] References Cited

UNITED STATES PATENTS

| | | | |
|---|---|---|---|
| 587,773 | 8/1897 | Wolhaupter | 85/21 |
| 635,846 | 10/1899 | Dice | 85/21 |
| 1,320,085 | 10/1919 | Myers | 85/21 |
| 1,783,391 | 12/1930 | Schorr et al. | 85/11 |
| 2,567,935 | 9/1951 | Hallock | 85/11 |
| 2,740,505 | 4/1956 | Flora | 85/11 |
| 2,751,052 | 6/1956 | Flora | 85/11 |

FOREIGN PATENTS OR APPLICATIONS

| | | | |
|---|---|---|---|
| 638,994 | 11/1936 | Germany | 85/21 |
| 682,577 | 11/1952 | United Kingdom | 85/11 |

*Primary Examiner*—Roy D. Frazier
*Assistant Examiner*—Rodney H. Bonck
*Attorney, Agent, or Firm*—Teagno & Toddy

[57] ABSTRACT

An improved sheet metal nail utilizing a protrusion, or protuberance, aligned with the locking tangs and interposed the tangs and the leading edge of the nail is provided. The protrusion enters the media into which the nail is driven prior to entry of the tangs and thus provides a lead hole for the tangs to minimize damage thereto during the nail driving operation.

7 Claims, 8 Drawing Figures

| 3,983,779 |

NAIL

BACKGROUND OF THE INVENTION

1. Field of the Invention

This invention relates to sheet metal nails and more particularly relates to improvements in sheet metal roofing nails for use in roofing structures and the like in which the nail is driven into a thickness of sheet steel or other sheet metal to secure a pad or layer of insulation or similar material thereto.

2. Description of the Prior Art

Sheet metal nails such as sheet metal roofing nails are well known in the prior art. Such nails are generally T or L shaped in cross-section comprising a generally flat head portion and a shank portion extending generally perpendicular from the head portion. The shank portions have a V shaped leading edge designed for piercing at the end most distant the head portion. The shank portions are generally provided with at least one locking member, or tang, for lockingly engaging the underside of the media into which the nail is driven. Many nails utilize one or more axially extending columns of tangs having tangs spaced at various distances from the head portion to provide locking of the nail when utilized with various thicknesses of insulation material and/or roof decks and the like. Examples of the prior art devices may be seen by reference to U.S. Pat. Nos. 2,740,505; 2,567,935 and 2,596,940.

The sheet metal nails of the prior art have been less than totally satisfactory as the tang or tangs closest the leading edge of the nail tended to be weakened and/or destroyed when the nail was driven into certain media. This is a particularly troublesome problem in a single tang type of nail and in those nails wherein the tangs most distant the head portion are relied upon to provide a locking action.

SUMMARY OF THE INVENTION

In accordance with the present invention, the drawbacks of the prior art have been overcome to the extent that an improved sheet metal nail having at least one protrusion adjacent the leading edge of the shank portion and aligned with the tangs to provide a lead opening for the tang during the driving operation, and thus minimize damage to the tangs during the nail driving operation, is provided.

Accordingly, it is an object of the present invention to provide a new and improved sheet metal nail.

A further object of the present invention is to provide a new and improved sheet metal nail having means to protect the locking members, or tangs, during the nail driving operation.

These and other objects and advantages of the present invention will become apparent from a reading of the detailed description of the preferred embodiment taken in connection with the attached drawings.

DESCRIPTION OF THE PREFERRED EMBODIMENT

Figure 1:
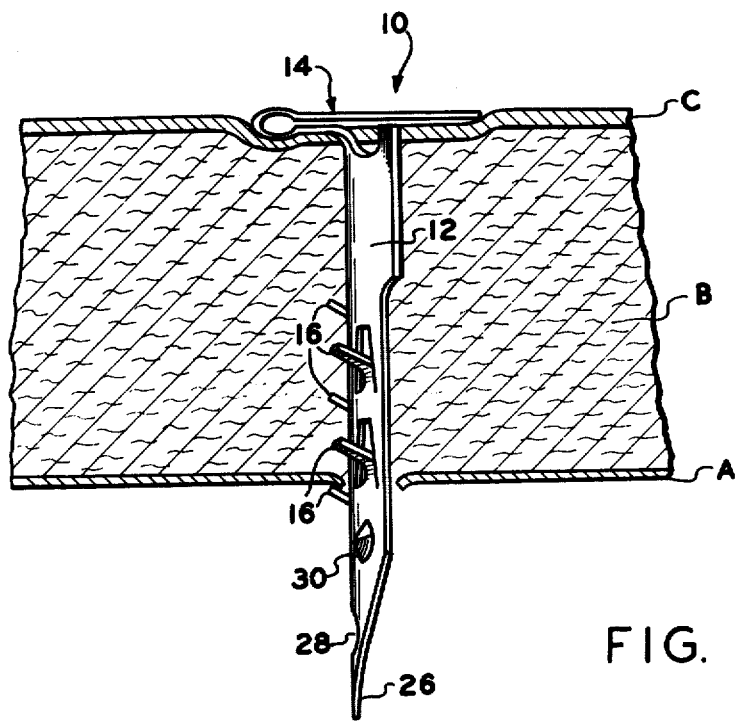
FIG. 1 is a sectional view of the improved sheet metal nail of the present invention as utilized in a typical roofing installation in which a pad or layer of insulation material is secured to sheet metal deck and positively locked in position.

The utilization of the improved sheet metal nail 10 in a typical roofing installation may be seen by reference to FIG. 1. In this installation, a layer or pad of insulation material B is secured to a sheet metal or sheet steel deck A which forms the primary support or base for a roof or wall. The shank 12 of the nail is driven through the insulation material B, pierces an opening in deck A and continues to penetrate the deck A until the head 14 of the nail contacts the upper surface of the insulation material. A washer-like disc C may be interposed the head of the nail and the upper surface of the insulation material. A plurality of tangs, or locking members, 16 are provided along the shank to engage the underside of the deck to lock the nail and the insulation material to the deck.

Figure 2:
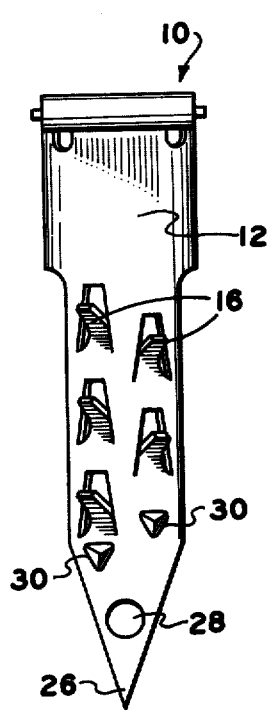
FIG. 2 is a fromt view of the sheet metal nail of the present invention.
Figure 3:
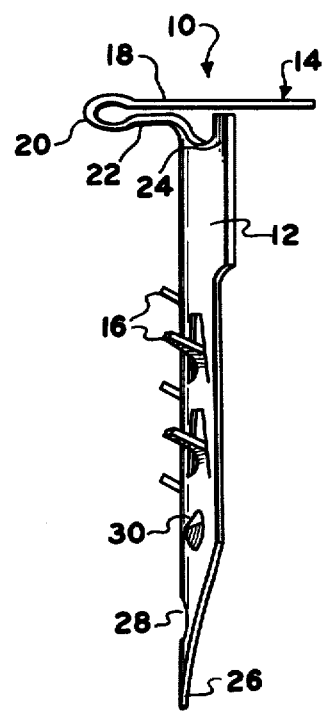
FIG. 3 is a side view of the sheet metal nail of the present invention.

The sheet metal nail, or roofing nail 10, as illustrated in FIGS. 2 and 3, is generally T shaped in cross-section having a horizontally extending head portion 14 and a vertically extending shank portion 12. It is understood that other shapes, such as L shaped nails, are possible and intended to fall within the scope of the present invention. The nail is of a sheet metal, such as spring steel, cold rolled steel, aluminum or the like and is of a gauge sufficient to meet the requirements of the intended installation. It is understood that the terms vertical, vertically extending, horizontal and horizontally extending are used as descriptive terms referring to the drawings and are not intended to limit the scope of the present invention.

The substantially flat head portion 14 comprises a continuous strip of sheet metal having a top portion 18, a return bend 20 at one end thereof and an underlying portion 22 extending from the return bend to the shank portion 12.

The shank 12 may be of any desirable length. The shank may be generally arcuate in cross sectional shape to provide additional rigidity and to provide an underlying support for the top member as at ribs 24. The free end of the shank, or the leading end, is provided with a V shaped edge 26 for piercing the material through which the nail is to be driven. A plurality of tangs, or locking members, 16 are provided in the shank at different distances from the head portion. The tangs are arranged in two aligned rows running parallel to the axis of the shank. The provision of tangs at various axial spacings from the head portion allows the nail to be utilized with insulation material and/or deck material of variable thickness.

The tangs 16 illustrated are of the cam locking type comprising upwardly and outwardly extending torques formed from inverted V or U shaped slots in the shank as is well known in the art and as can be seen in greater detail by reference to U.S. Pat. No. 2,740,505, assigned to the predecessor in interest of the assignee of this application and hereby incorporated by reference. It is understood various other types of tangs or locking members are utilized in nails of this type and such tangs are intended to fall within the scope of the present invention.

An aperture 28 is provided adjacent the leading edge 26 of the shank for use in hanging wire bundles, false ceilings and the like.

A pair of protuberances or protrusions 30 are formed in the shank adjacent the leading edge 26 thereof and are aligned with the rows of tangs 16. The protrusions 30 extend from the convex surface of the shank portion 12 by a distance less than the extension of the free ends of the tangs 16 from the convex surface of the shank. The protrusions are generally continuous and are intended to be substantially noncompressible during the nail driving operation.

Figure 4:
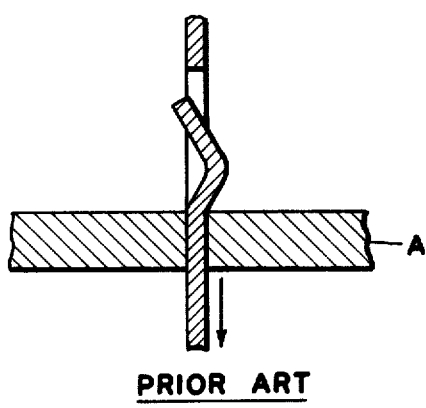
FIG. 4 is a partial sectional view of a prior art sheet metal nail partially driven into a sheet metal deck during the nail driving or piercing operation.

Prior art sheet metal nails did not utilize protrusions aligned with the tangs and interposed the tangs and the leading edge and thus the tangs thereof nearest the leading edge tended to be weakened and/or destroyed during the nail driving operation as is illustrated in FIG. 4. In FIG. 4 the leading edge of a prior art nail has pierced a deck A and the tang is about to pass through the aperture so created. It may be seen that as the nail continues to penetrate the deck, the tang will be forced inwardly and possibly nonresiliently deformed and/or destroyed. Damage of this nature to the tangs adjacent the leading edge of prior art sheet metal roofing nails has been a problem, especially when the nails were utilized with heavy gauge roof decks.

Figure 5:
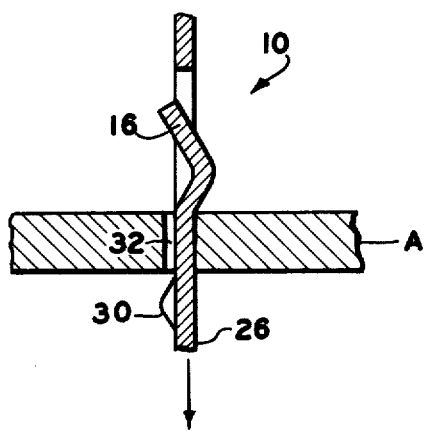
FIG. 5 is a partial sectional view of the sheet metal nail of the present invention during the nail driving operation just prior to the leading tang entering the pierced hole in the metal deck.

The sheet metal nail 10 of the present invention, as penetrating a roofing deck, is illustrated in FIG. 5. It may be seen that as the protrusion 30 passes through the deck a pilot slot 32, aligned with the tangs, is created. This pilot slot is of a lesser transverse dimension than the outer extension of the free ends of the tangs, and thus does not hinder the locking function of the tangs but does provide a means whereby a considerably lesser degree of tang deformation and/or displacement is required during the nail driving operation.

Figure 6:
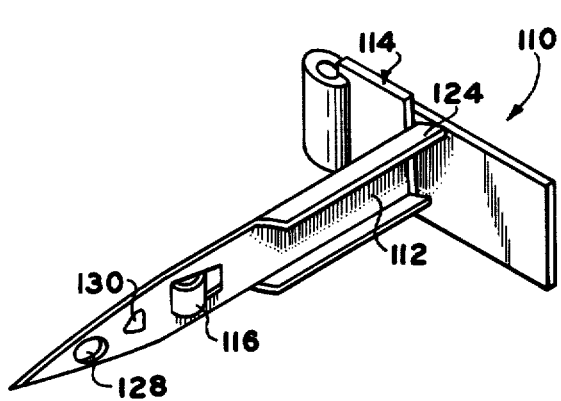
FIG. 6 is a perspective view of an alternate embodiment of the present invention.
Figure 7:
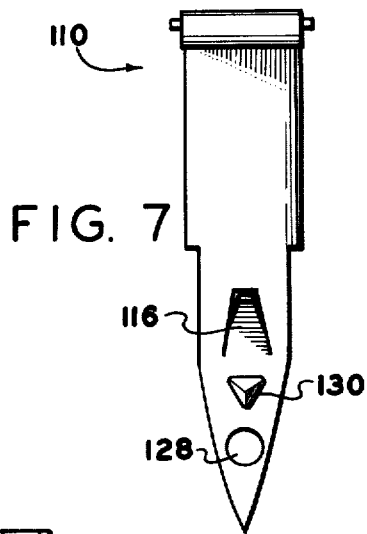
FIG. 7 is a front view of the embodiment of FIG. 6.
Figure 8:
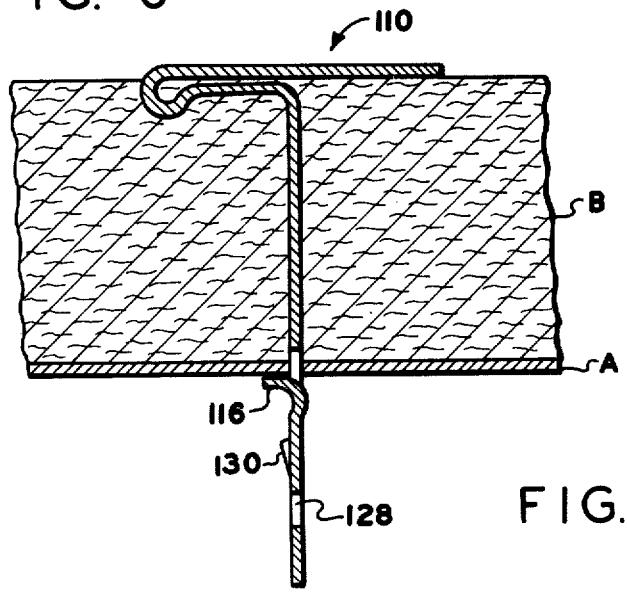
FIG. 8 is a sectional view of the sheet metal nail of FIGS. 6 and 7 as utilized in a typical roofing installation.

An alternate embodiment of the present invention is illustrated in FIGS. 6–8. In this embodiment the sheet metal roofing nail 110 comprises a T shaped body having a head portion 114 and a shank portion 112. The nail 110 differs functionally from the nail 10 described above only in that a single tang 116 is utilized limiting the use of the nail to decks and insulation having a narrow range of combined thickness. The protrusion 130 utilized in this nail is especially important since destruction or damage to the single tang 116 will render the nail useless.

Although this invention has been described in its preferred form with a certain degree of particularity, it is understood that the preferred embodiment has been described by way of example only and that various modifications may be resorted to without departing from the spirit and scope of the invention as hereinafter claimed.

I claim:

1. An improved sheet metal nail of the type comprising a generally horizontally extending head and a generally vertically extending shank, said shank defined by two vertically extending surfaces and having at least one tang extending outwardly from one of said vertically extending surfaces, the improvement comprising: a protrusion extending outwardly from said one vertically extending surface of said shank, said protrusion aligned with said tang and interposed said tang and said leading edge, said protrusion extending outwardly from said one vertically extending surface by a distance less than the distance the free end of said tang is spaced from said one vertically extending surface, said protrusion formed by a continuous dimpled depression in the vertically extending surface of said shank opposite said one vertically extending surface.

2. The improved sheet metal nail of claim 1 wherein said improvement further comprises an aperture in said shank adjacent the leading edge.

3. The improved sheet metal nail of claim 1 wherein said shank has at least one vertically extending column of tangs, each of said tangs separated by a different distance from said head and said shank has at least one protrusion aligned with each column of tangs.

4. The improved sheet metal nail of claim 1 wherein said dimpled depressions are of a generally triangular shape having a base generally parallel to the head and an apex extending towards the leading edge.

5. An improved sheet metal nail of the type having a generally T shaped body comprising a generally horizontal, flat head and a generally vertical shank, said shank being generally arcuate in cross-section with at least one tang extending outwardly from the convex surface thereof, said shank having a generally V shaped leading edge at its end distant the head, said tang comprising a tongue formed from a generally inverted U shaped slot cut in said shank, the improvement comprising:
at least one protrusion extending from said convex surface and aligned with said tang, said protrusion interposed said tang and said leading edge, said protrusion comprising a continuous, non-broken dimple formed in said concave surface, said protrusion extending a distance from said convex surface less than the distance the free end of said tang is spaced from said convex surface.

6. The improved sheet metal nail of claim 5 wherein said dimple is of a generally triangular shape having a base generally parallel to the head and an apex extending towards the leading edge.

7. The improved nail of claim 6 wherein said improvement further comprises an aperture in said shank, said aperture located adjacent said leading edge.

* * * * *